United States Patent [19]
Poussin et al.

[11] Patent Number: 5,390,219
[45] Date of Patent: Feb. 14, 1995

[54] DEVICE FOR TRAPPING MIGRATING BODIES WITHIN THE SECONDARY CIRCUIT OF A STEAM GENERATOR

[75] Inventors: Christophe Poussin, Courbevoie; Henri Ayme, Suresnes, both of France

[73] Assignee: Framatome, Paris la Defense, France

[21] Appl. No.: 984,682

[22] Filed: Dec. 2, 1992

[30] Foreign Application Priority Data

Dec. 2, 1991 [FR] France .................. 91 14900

[51] Int. Cl.⁶ ...................... G21C 19/42
[52] U.S. Cl. ...................... 376/313; 376/310
[58] Field of Search .............. 376/313, 316, 310, 211; 165/95

[56] References Cited

U.S. PATENT DOCUMENTS

| | | | |
|---|---|---|---|
| 3,916,844 | 11/1975 | Cassell | 122/32 |
| 4,261,300 | 4/1981 | Cross et al. | 122/388 |
| 4,343,707 | 8/1982 | Lucas | 210/695 |
| 4,738,698 | 4/1988 | Holcblat | 55/440 |
| 5,019,329 | 5/1991 | Franklin et al. | 376/316 |

FOREIGN PATENT DOCUMENTS

0183049  6/1986
1126306  9/1968  United Kingdom .

*Primary Examiner*—Donald P. Walsh
*Assistant Examiner*—Meena Chelliah
*Attorney, Agent, or Firm*—Pollock, Vande Sande & Priddy

[57] ABSTRACT

A device for trapping migrating bodies within the steam generator or secondary circuit of a nuclear installation is constituted by grids (6) placed between the upper part of the tube casing (8) and the pressure casing (7) of the steam generator. The meshes of the grids are so dimensioned as to prevent the passage of objects liable to jam between the tubes of the tube bundle of the primary circuit.

7 Claims, 4 Drawing Sheets

5,390,219
1

DEVICE FOR TRAPPING MIGRATING BODIES WITHIN THE SECONDARY CIRCUIT OF A STEAM GENERATOR

FIELD OF THE INVENTION

The invention relates to steam generators used in nuclear installations for electric power generation, particularly those using one or more pressurized water reactors. The invention more particularly relates to a device placed in the secondary circuit of the steam generator.

Prior Art

In a nuclear power station, in which the power supplying means is constituted by a pressurized water nuclear reactor, a primary circuit is used for removing the energy produced by the reactor. Pressurized water is enclosed within the the primary circuit. Use is made of a heat exchanger, such as a steam generator, for utilizing the thermal energy extracted by the primary circuit from the nuclear reactor.

Such a steam generator is shown in FIG. 1. The primary circuit has an inlet 1 and an outlet 2 located at the lower end of the steam generator. The pressurized water flowing in the primary circuit traverses, within the steam generator, a tube bundle 3, in the lower part of the steam generator.

The inlet for the water for the secondary circuit 4 is lateral and is positioned in the upper part. The outlet 5 of the secondary circuit is located in the upper part of the steam generator. After entering through the inlet of the secondary circuit 4, the water from the latter is distributed by a supply ring 6 and is piped between the pressure envelope 7 of the steam generator and the envelope 8 of the tube bundle 3. It then rises along the latter and is vaporized by contact with it. On reaching the upper end 9 thereof, it is collected by the upper part 10 of the envelope 7 and by discharge pipes 12 equipped with centrifugal separators for separating the water from the steam. The steam is then discharged through the outlet 5 after passing through one or more dryers 13, which complete the separation of the water from the steam.

The water in saturated form separated in this way from the steam is known as recirculated water and is piped via the pipe or pipes 15 before being mixed with the water from the supply ring 6.

Bearing in mind the structure of that part of the secondary circuit traversing the steam generator, it is readily apparent that relatively small objects, enclosed within the secondary circuit may follow the path of the latter within the steam generator and may thus be jammed or wedged in the narrow passages. constituted by the spaces separating the tubes of the tube bundle 3.

Bodies foreign to the steam generator and having different shapes, sizes and forms, referred to as migrating bodies, can be accidentally introduced into the steam generator via the secondary water supply system, or during maintenance operations. During the operation of the steam generator, these bodies may be carried along by the secondary fluid and then become fixed at different points of the steam generator, such as the tube plate 31, or enter the tubes of the bundle 3. These objects can damage the walls of the tubes by impact or friction.

SUMMARY OF THE INVENTION

It is an object of the invention is to limit the size and number of migrating bodies coming from the secondary water supply system and the upper part of the steam generator and which are liable to reach the tubular plate and damage the bundle of tubes.

The subject of the invention is a device for trapping migrating bodies within the secondary circuit of a steam generator of a nuclear power generation installation, constituted by a plurality of grids or equivalent mechanical filtering systems which, for optimum efficiency, occupy the entire annular section of the secondary circuit, downstream of the water supply tubes for the secondary circuit and upstream of the introduction of the water into the bundle of tubes of the primary circuit.

When the tubes of the bundle of tubes are spaced by a given distance, the efficiency of the device according to the invention increases if the grids have meshes whose maximum width is smaller than such distance, so as to not allow the passage of objects or bodies liable to jam between the tubes.

In the main construction of the device according to the invention, the grids or the like are constituted by circular sectors fitted on two radial brackets common to two adjacent sectors and welded to the envelope of the tube bundle. In this case, the grids are preferably screwed to the brackets so as to be dismantlable.

In the preferred embodiment of the device according to the invention, the width of the grids is slightly less than the width of the annular section of the secondary circuit at the point where the grids are installed so as to leave a clearance of a few millimeters, thus permitting expansions between the pressure envelope and the tube bundle envelope of the steam generator.

In this case, first outer strips can be placed on the inner wall of the steam generator pressure envelope in the annular section in order to fill the external circular clearance between the grids and the pressure envelope. Second circular strips fixed on the outer periphery of the grids make it possible to avoid the reintroduction into the space between the pressure envelope and the tube bundle envelope of objects trapped on the grids. In the same way, inner strips can be placed between the grids and the outer wall of the tube bundle envelope.

In order to be able to withstand the possible impacts of migrating bodies, the various hydraulic stresses and the weight of operators, the grids have a thickness of a few centimeters, so as to have an adequate mechanical strength.

BRIEF DESCRIPTION OF THE DRAWINGS

The invention and its technical features will be better understood from reading the following description with respect to the attached drawings.

DETAILED DESCRIPTION OF AN EMBODIMENT OF THE INVENTION

Figure 1:
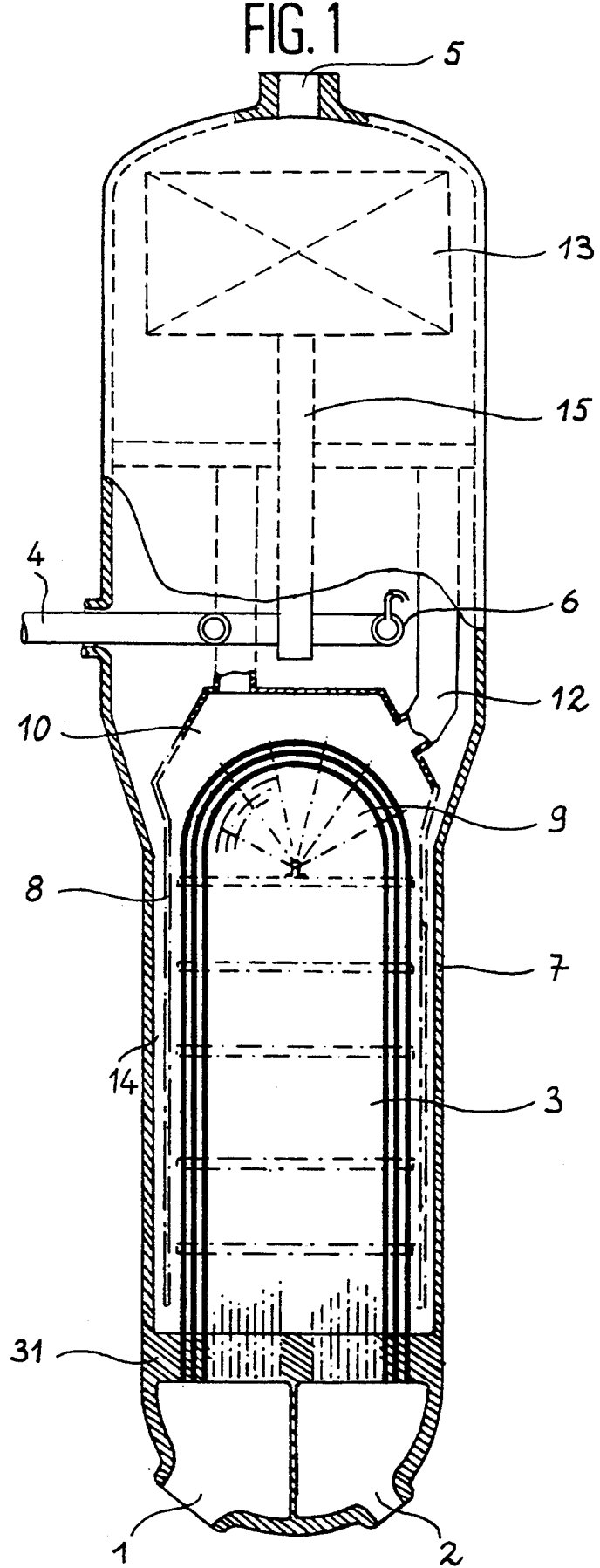
FIG. 1 is a front elevation, partly in section, of a steam generator containing the device according to the invention.
Figure 2:
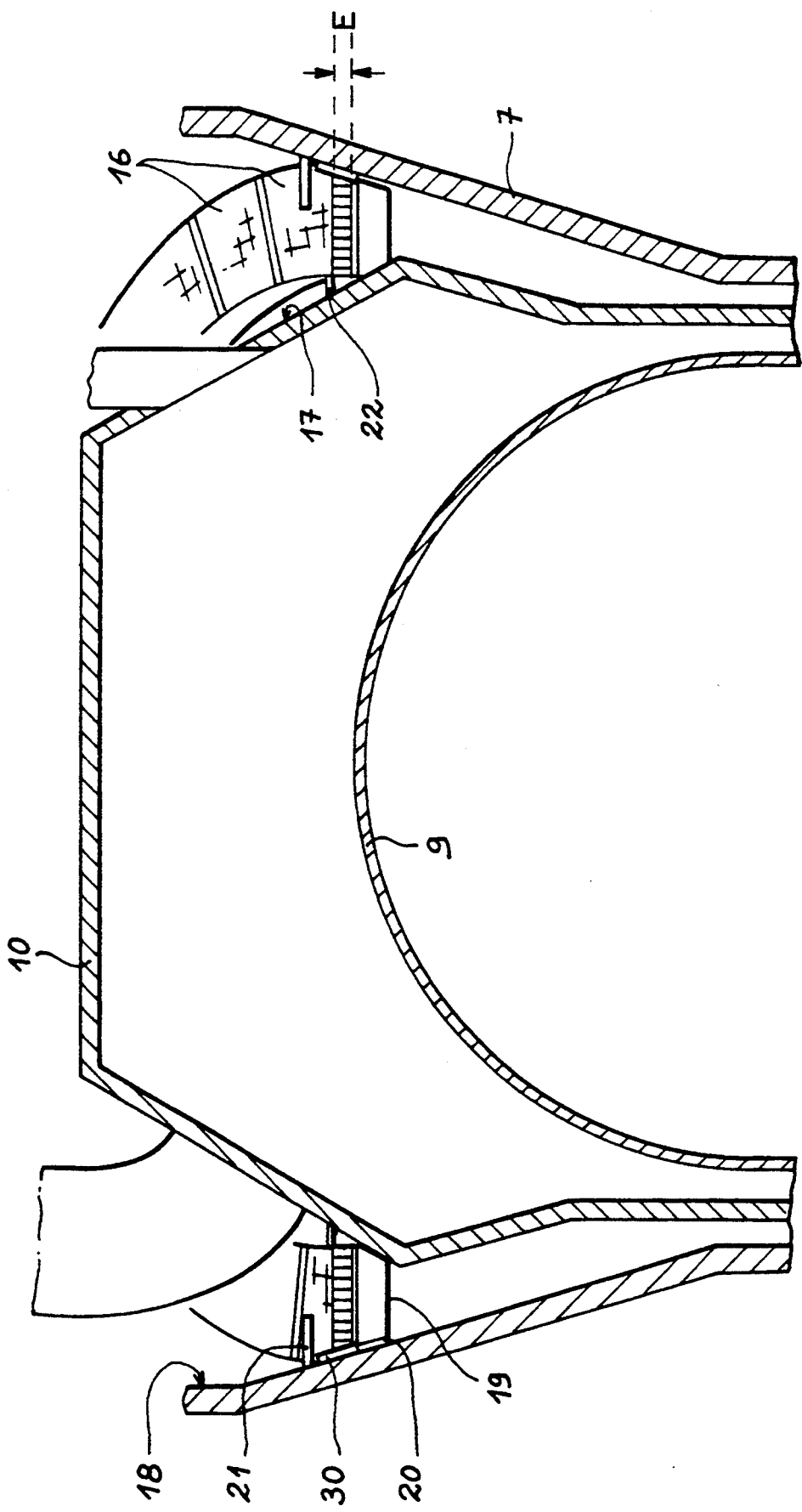
FIG. 2 is an enlarged detail view of the device according to the invention installed in the steam generator.

FIG. 2 shows the intermediate part of the steam generator of FIG. 1. The upper part 10 of the tube bundle envelope 8 surrounds the upper part 9 of the bundle of tube 3. It can be seen that at this level the pressure envelope 7 widens, i.e., it has a conical shape, leaving a space 14, known as the water return, between the pressure envelope 6 and the outside of the envelope 8. It is in this space that the water distributed by the supply ring mixed with the recirculated water is piped into the lower part of the steam generator and that the device according to the invention can be located.

FIG. 2 shows circular sectors of grids 16 placed on the outer surface 17 of the upper part 10 of the nest bundle envelope 8 and extending through the water return 14 in order to be flush with the inner surface 18 of the pressure envelope 7. The grids 16 are shown in the horizontal position, but this is only an example. The functional aspect of the position of the grids 16 is that they must extend over virtually the entire cross-section of the water return 14 in order to have an optimum efficiency.

The grids 16 are preferably positioned in the water return 14 by means of brackets 19, which are preferably fixed to the outer surface 17 of the upper part 10 of the tube bundle envelope 8.

The width of the grids 16 is very slightly less than the width of the water return 14 at this location leaving, a space or clearance 20 between the grids 16 and the inner surface 18 of the pressure envelope 7. The function of this clearance 20 is to permit expansions due to temperature differences between the pressure envelope 7, the tube bundle envelope 8, the grids 16 and the brackets 19.

FIG. 2 also shows the outer strips 21 fixed to the outer periphery of the grids 16 to prevent the reintroduction by the secondary water of objects trapped on the grids 16, between the latter and the pressure envelope 7.

Inner strips 22 are positioned horizontally between the grids 16 and the outer surface 17 of the upper part 10 of the tube bundle envelope 8. Thus, the clearance left between grids 16 and the envelope 8, which can be conical, cylindrical or the like, is filled. In the same way, outer strips 30 fixed to the inner surface of the pressure envelope 7 fill the clearance left between the grids 16 and the pressure envelope 7.

Assuming that the tubes of the bundle 3 (FIG. 1) are spaced by a distance, the meshes of the grids 16 are dimensioned in such a way as not to permit the passage of migrating bodies or objects liable to jam or become wedged between two tubes of the bundle 3. In other words, the meshes of the grids 16 must not permit the passage of objects whose size exceeds the distance separating the tubes. Thus, the maximum width of the meshes of the grids 16 is less than the said distance.

The grids 16 are shown with a certain thickness E, i.e., height. Bearing in mind that these grids 16 can be made of metal, they can therefore have a sufficient mechanical strength to withstand the various stresses, in particular top to bottom vertical stresses. Thus, the grids 16 must firstly withstand the hydraulic stresses imposed by the mixture of the water from the supply ring and the recirculated water descending between the pressure envelope 7 and the tube bundle envelope 8, during both normal and emergency operation. Moreover, during the installation of the steam generator, the grids 16 can carry one or more operators, thus facilitating the installation of the various steam generator components, together with inspection and maintenance operations. In this case, the grids 16 form a type of all-round path around the upper part 10 of the tube bundle envelope 8. Without damage, i.e., breaking or deformation, grids 16 must also be able to withstand the impacts of migrating bodies.

Figure 3:
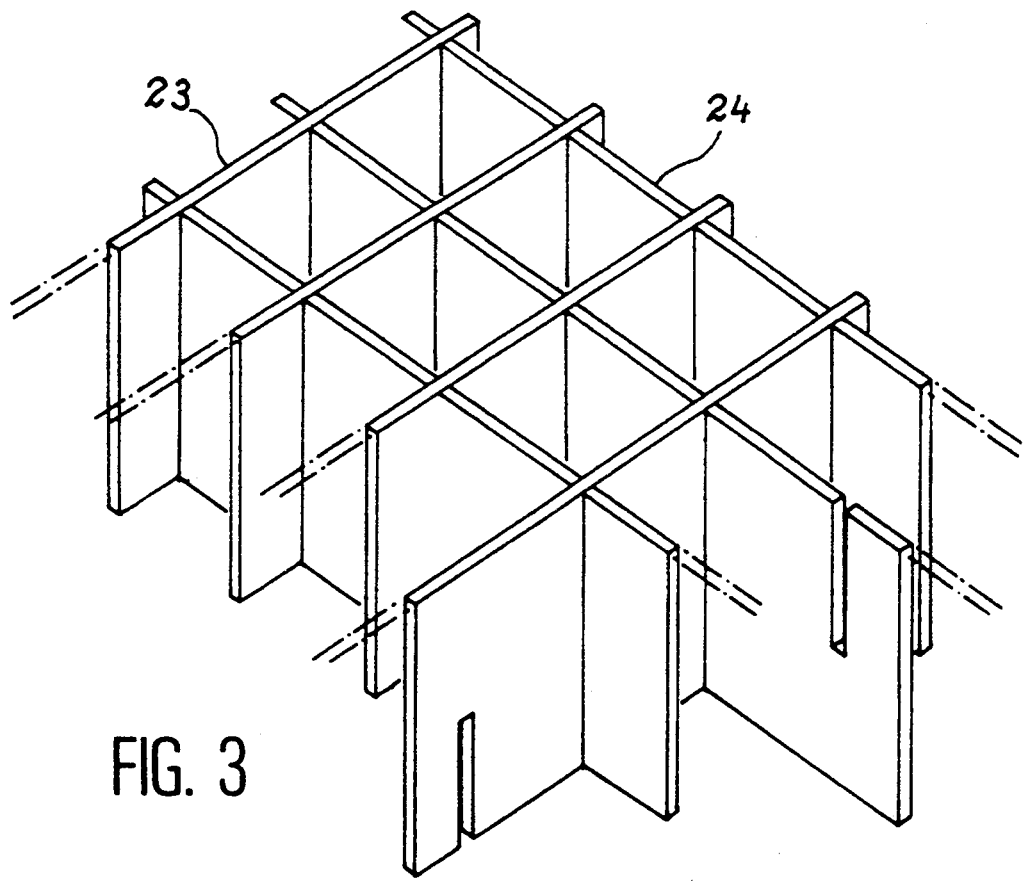
FIGS. 3, 4 and 5 show three examples of the meshes of the grids of the device according to the invention.

As shown in FIG. 3, the mesh for the grids 16 may be square. Without taking into account the scale in which these meshes are shown, the diagonal of the square of each of the meshes must be smaller than the distance separating the tubes of the bundle. This is an order of magnitude for indicating that the size of the grid meshes of the device according to the invention must be such that they do not permit the passage of objects liable to jam or become wedged between the tubes of the bundle.

This square mesh grid can be constituted by a first series of parallel metal sheets 23, defining two opposite sides of the meshes of the same column or line, and a second series of metal sheets 24 perpendicular to sheet 23 and fitted in the latter in order to define the two other opposite sides of the meshes. The fitting can be achieved by providing slots 29 on half the height in each of the metal sheets of each series at the point of intersection of the sheets 23 and 24.

Figure 4:
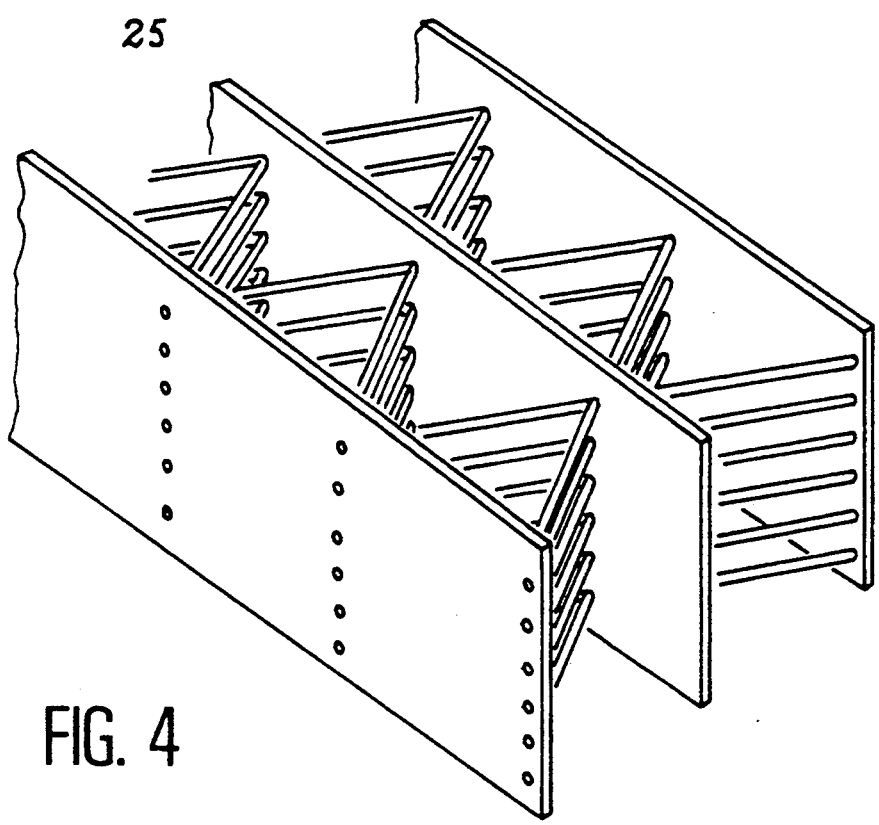

FIG. 4 shows grids having triangular meshes. It is thus possible to construct a thick grid formed by a series of bent or undulated metal sheets welded on either side of two planar sheets. The largest side of the triangle must be smaller than the distance separating the tubes of the bundle.

Figure 5:
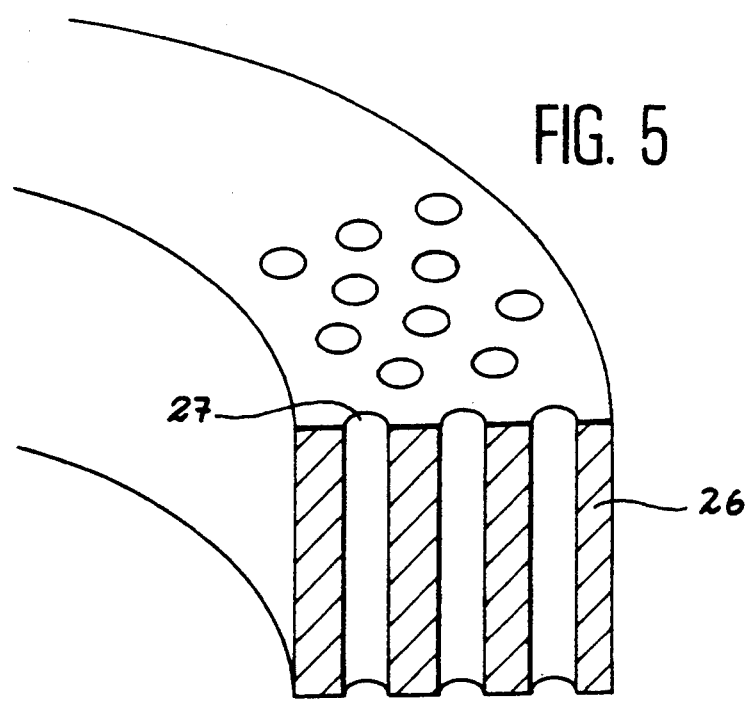

FIG. 5 shows a third embodiment of the grids constructed in a rigid plate 26, in which holes 27 are made, e.g., in a staggered manner. The diameter of the holes 27 must obviously be smaller than the distance separating the tubes of the bundle.

The embodiments of the meshes described in FIGS. 3, 4 and 5 are in no way limitative with respect to the construction and shape of the meshes forming the grids 16.

Figure 6:
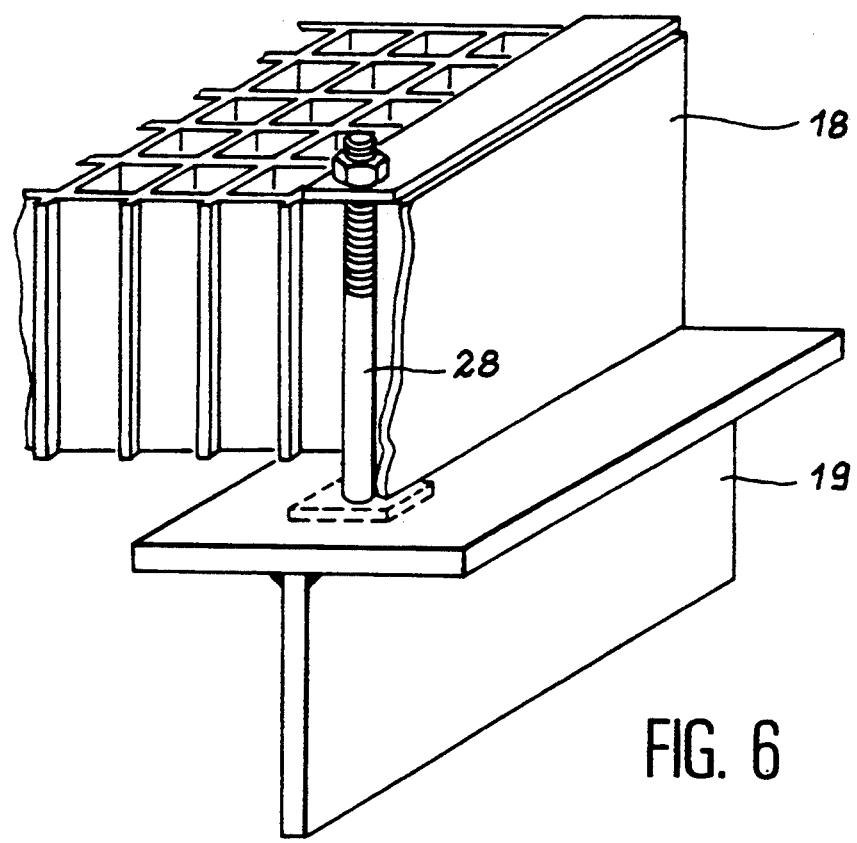
FIG. 6 shows the attachment of the device in a steam generator.

FIG. 6 shows in detail a way of attaching the grids 16 to their brackets 19, which have a T-shaped profile. The bracket 19 extends radially with respect to the steam generator tube bundle envelope and can be welded to the latter.

The grids 16 can be fixed to the brackets 19 by screwing, e.g., using bolts 28, which makes it possible to dismantle them. They can also be welded to the brackets 19. Thus, it is possible to fix to each bracket 19 two adjacent grids 16, with or without leaving a space between them. The T-shape of the brackets and in particular the upper part of the T makes it possible to close any radial clearances left between the grids 16.

Therefore the grids 16 make it possible to form a type of trapping or filtering grating for migrating bodies from the upper inner circuits of the steam generator, the feed water system of the secondary circuit or which are simply circulating within the steam generator.

The invention is not limited to the embodiments described hereinbefore. Any system equivalent to a grid and fulfilling the same function can be used. The supporting procedure can also differ and can involve welding to other parts or using other means (e.g., screwing).

The height position of the device within the steam generator can be at a random level between the secondary water supply ring and the tube plate.

We claim:

1. Device for trapping migrating bodies within the secondary circuit of a steam generator of a nuclear electric power generating installation, constituted by a filtering system positioned across the annular cross-section of the secondary circuit, downstream of the intake tubes (4) for the water into the secondary circuit and upstream of the entry of the water into the tube bundle (3) of the primary circuit, the tubes of the tube bundle (3) being spaced by a given distance, the filtering system being constituted by grids (16) having meshes with a maximum width smaller than said given distance so as to only allow the passage only of migrating bodies or objects liable to jam between the tubes, said grids having a thickness (E) sufficient to give said grids (16) adequate mechanical strength for resisting stresses such as the weight of operators, hydraulic stresses in both normal and emergency operation mad local impacts of migrating bodies without deformation or fracture.

2. Device according to claim 1, wherein the grids (16) are constituted by circular sectors mounted on two radial brackets (19) common to two adjacent sectors and welded to an envelope (8) of the tube bundle.

3. Device according to claim 2, wherein the grids (16) are screwed to said brackets (19) so as to be dismantlable.

4. Device according to claim 1, wherein the grids (16) are slightly narrower than the annular cross-section of the secondary circuit, at the point where the grids (16) are positioned, so as to leave a clearance (20) to permit expansion between a pressure envelope (7) and an envelope (8) of the tube bundle of the steam generator.

5. Device according to claim 4, comprising first outer strips (21) placed on the outer periphery of the grids (16), in order to prevent the reintroduction by secondary water of migrating bodies trapped on the grids (16) into file outer circular clearance (20) between the grids (16) and file pressure envelope (7).

6. Device according to claim 4, comprising inner strips (22) placed between the grids (16) and the outer surface (17) of the tube bundle envelope (8).

7. Device according to claim 4, comprising second outer strips (30) fixed to the inner face (18) of the pressure envelope (7) of the steam generator in the annular section (14) in order to fill the outer annular clearance (20) between the grids (16) and the pressure envelope (7).

* * * * *

UNITED STATES PATENT AND TRADEMARK OFFICE
CERTIFICATE OF CORRECTION

PATENT NO. : 5,390,219
DATED : February 14, 1995
INVENTOR(S) : Poussin et al

It is certified that error appears in the above-indentified patent and that said Letters Patent is hereby corrected as shown below:

In column 5, claim 1, line 14, delete "only";

line 19, change "mad" to --and--.

In column 6, claim 5, line 15, change "file" to --the--.

Signed and Sealed this

Fifth Day of September, 1995

Attest:

BRUCE LEHMAN

Attesting Officer

Commissioner of Patents and Trademarks